United States Patent

[11] 3,547,234

| [72] | Inventors | Curtis F. Cummins<br>Decatur;<br>Donald L. Smith, Peoria; Larry G. Warren,<br>Decatur; Lawrence F. Schexnayder, Joliet,<br>Ill. |
|---|---|---|
| [21] | Appl. No. | 799,295 |
| [22] | Filed | Feb. 14, 1969 |
| [45] | Patented | Dec. 15, 1970 |
| [73] | Assignee | Caterpillar Tractor Co.<br>Peoria, Ill.<br>a corporation of California |

[54] DUAL RANGE BRAKE SYSTEM FOR VEHICLES
2 Claims, 3 Drawing Figs.

[52] U.S. Cl....................................................... 188/170,
188/106; 303/2, 303/9
[51] Int. Cl....................................................... F16d 65/24
[50] Field of Search............................................ 188/106F,
170; 303/2, 6, 9

[56] References Cited
UNITED STATES PATENTS

| 1,548,394 | 8/1925 | Sumner........................ | 188/170UX |
| 2,342,750 | 2/1944 | Newell.......................... | 188/170X |
| 3,386,775 | 6/1968 | Jones............................ | 303/2 |
| 3,415,576 | 12/1968 | Biabaud........................ | 303/2X |
| 3,423,134 | 1/1969 | Knapp........................... | 303/2 |
| 3,465,850 | 9/1969 | Sexton.......................... | 188/170X |

Primary Examiner—George E. A. Halvosa
Attorney—Fryer, Tjensvold, Feix, Phillips and Lempio

ABSTRACT: In work vehicles the service brakes can be equipped with a combination mechanical and hydraulic-actuating means whereby two separate ranges are available; one range having mechanical brake actuation through preload spring means with hydraulic release and the second range having a combination of complementary mechanical and hydraulic brake actuation for maximum braking capacity, which provides full braking capacity along with a fail-safe brake system operable in one of the ranges.

INVENTORS
CURTIS F. CUMMINS
LAWRENCE F. SCHEXNAYDER
DONALD L. SMITH
LARRY G. WARREN

BY

ATTORNEYS 3,547,234

DUAL RANGE BRAKE SYSTEM FOR VEHICLES

BACKGROUND OF THE INVENTION

In highway trucks, tractors and other vehicles employed in material handling or earthmoving operations, it has often been the practice to provide auxiliary actuating mechanisms for the normal service brakes which will operate the brakes should the normal-actuating system fail. An example of such a braking system is disclosed in U.S. Pat. No. 2,809,723 issued to Howze where large springs apply the brakes should air pressure be lost in the normal pneumatic brake actuation system. Such a system is fail-safe since the brakes will be applied automatically should the normal-actuating system fail.

Other fail-safe systems employ auxiliary brakes which are mechanically preloaded to actuate such auxiliary brakes should pressures employed to release the preload be lost or interrupted. Usually such loss or interruption of this pressure will result from a malfunction in the normal brake actuation system. Typical of such an arrangement is the system disclosed in U.S. Pat. No. 2,948,359 issued to Barrett.

With the increasing emphasis on safety both on and off the highways, the fail-safe type braking systems, like those mentioned above, have been scheduled or actually employed on many types of vehicles in the material handling and earthmoving field. Further, impending legislation and new safety laws often require suitable fail-safe brake systems to stop vehicles automatically should a malfunction occur which could otherwise make it impossible to control the speed of the vehicle.

While employment of prior art devices, such as those mentioned above, may meet the legal requirements, the mechanical preload (usually springs) often results in very abrupt braking of the vehicle, which in certain environments can be detrimental to the operator and dangerous to other vehicles in close proximity. Further, such prior art systems are usually complex and expensive, especially when a considerable amount of apparatus is required to provide the braking and fail-safe systems.

SUMMARY OF THE INVENTION

An economical dual-range braking system is provided by the instant invention which overcomes many of the disadvantages of the type noted above. The brake system includes a combination of the service brakes of the vehicle with a controlled actuator which is mechanically preloaded to cause the service brakes to be applied and hydraulic jacks which are operable both to proportionally relieve the mechanical preload on the controlled actuator of the service brakes in one braking range and to proportionally assist the mechanical preload acting on the controlled actuator in another range to achieve full braking capacity of the service brakes. To cause the hydraulic jack system to function as indicated above, a hydraulic control system is provided between the brake-operating means controlled by the operator of the vehicle and the controlled actuator which causes the brakes to be applied.

BRIEF DESCRIPTION OF THE DRAWINGS

The invention described herein will be better understood by referring to the following drawings in conjunction with the specification wherein.

DESCRIPTION OF AN EMBODIMENT

Figure 1:
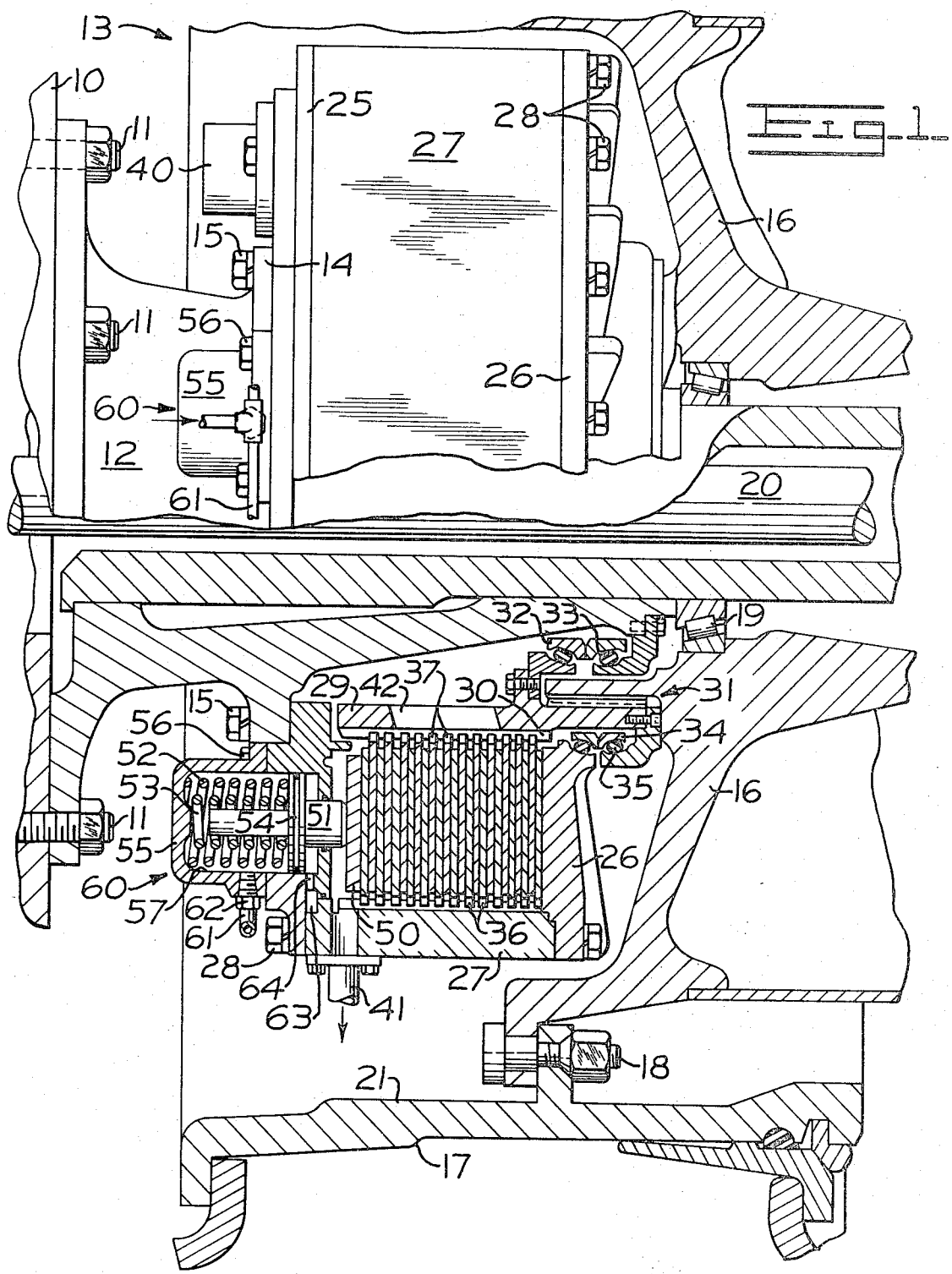
FIG. 1 is an elevation of a broken-away end portion of an axle of an earthmoving vehicle, with parts shown in section for additional detail of the dual-range braking system.

In FIG. 1, an earthmoving vehicle 10, through studs 11, has a cylindrical axle housing 12 mounted thereon to form the outboard end of the axle structure of the vehicle. This housing supports an oil cooled brake assembly 13 bolted on its flange 14 with bolts 15 and also rotatably supports a hub 16 on which rim 17 is mounted for carrying one of the tires of the vehicle. Lug bolts 18 secure the rim to the hub which is supported through bearing 19 on the axle housing and driven by axle shaft 20. The above general arrangement with the brake assembly located within an inner recess 21 of the rim, as shown, protects the brake assembly from damage.

The brake assembly 13, which forms the service brakes associated with the wheels of the vehicle, includes an inner end plate 25 which is bolted to flange 14 of the axle housing and an outer end plate 26 with a hollow cylindrical shell 27 separating the inner and outer end plates which are secured to the shell with bolts 28.

Located within the housing formed by the end plates 25 and 26 and shell 27 is a smaller circular drum 29 having a toothed outer periphery 30 that is attached to hub 16 through a male and female spline connection 31. Since this drum projects through a circular aperture in the outer end plate 26 and the brake assembly is an oil cooled unit, it is necessary to provide appropriate seals between the drum, the axle housing 12 and the hub 16. One sealing arrangement is effected by metal to metal ring seals 32 supported on O-rings 33 which in turn are supported on members projecting from the axle housing and hub respectively. A similar metal to metal ring seal is formed with metal ring seals 34 supported on O-rings 35 positioned on members extending from the outer end plate and hub 16, respectively, as illustrated in FIG. 1.

The inner surface of the shell 27 is toothed so that a plurality of conventional brake discs can be interleaved in a conventional manner between the toothed inner surface of the shell and the toothed outer periphery of the drum 29. In FIG. 1, metal discs 36 are connected to shell 27 through mating toothed structures while the friction face elements 37 located between each of the metal discs are similarly keyed to the toothed outer periphery of the drum 29, as illustrated.

In the braking assembly illustrated, cooling oil enters through an inlet 40 and egresses through outlet 41 and drum 29 has apertures 42 to allow cooling oil to pass through and around the interleaved discs.

As illustrated in FIG. 1, the plurality of interleaved discs 36 and 37 can be compressed in an axial direction against an inside surface of the outer end plate 26 of the brake assembly 13 thereby causing friction forces to build up between the contiguous discs and a braking action on hub 16 to be accomplished. Normally, the actuating mechanism of such a system is spring loaded to relieve forces acting to compress the discs against the outer end plate and a hydraulic pressure source is used to apply the necessary compressive force through an actuator system, since otherwise the brakes would be applied by the spring forces.

However, the reverse is true in the instant invention and the actuator system consisting of the pressure plate 50 and plungers 51 bearing thereon, is arranged so that springs 52 and 53 associated with each plunger, urge the mechanisms in a direction to apply (increase friction between the discs) the brakes of the vehicle. These springs are located between a piston 54 associated with each plunger and the inside end of a cap structure 55 each of which is bolted to the outboard side of end plate 25 with bolts 56 to form a fluid tight chamber. Each of the plurality of plunger 51, circumferentially mounted on the inner end plate, include an identical spring preload arrangement.

Each piston 54 associated with each plunger is received in associated bore 57 which has a smaller aperture through which its plunger 51 projects through the end plate to engage pressure plate 50. The aperture includes an O-ring seal to prevent the leakage of oil around the plunger, and piston 54 also includes an O-ring seal, as can be seen in FIG. 1. In the structures described above for each of the plungers, it can be appreciated that two chambers are formed, one on each side of each piston 54 thereby forming a double-acting hydraulic cylinder jack means. Thus, oil pressure acting on the plunger side of the piston will oppose the spring forces while oil pressure on the spring side of the piston will assist the spring forces.

The above arrangement allows the fail-safe system to be incorporated into the service brake simply and economically. Normally, the springs will be selected so that 30 percent to 60 percent of the capacity of the brake system will be available through the forces supplied by the springs. Thus, if all hydraulic power is lost the springs will supply from 30 percent to 60 percent of the total braking capacity of the brake system for emergency or parking, as the case may be.

Like chambers or sides of the circumferentially arranged double-acting hydraulic cylinder jacks 60 are connected to separate manifolds so their plunger side or their spring sides can be pressurized in unison. A circular pipe manifold 61 is connected in common to the spring chambers through fittings 62 in the caps 55. A passage in the end plate 25 forms the other manifold 63 and is connected to the plunger side of each piston 54 through small passage 64.

Thus, pressurization of manifold 63 will release the braking forces exerted by the springs 52 and 53 in each double-acting cylinder while common pressurization of the spring chambers will supplement the forces of the springs for full braking capacity.

Figure 2:
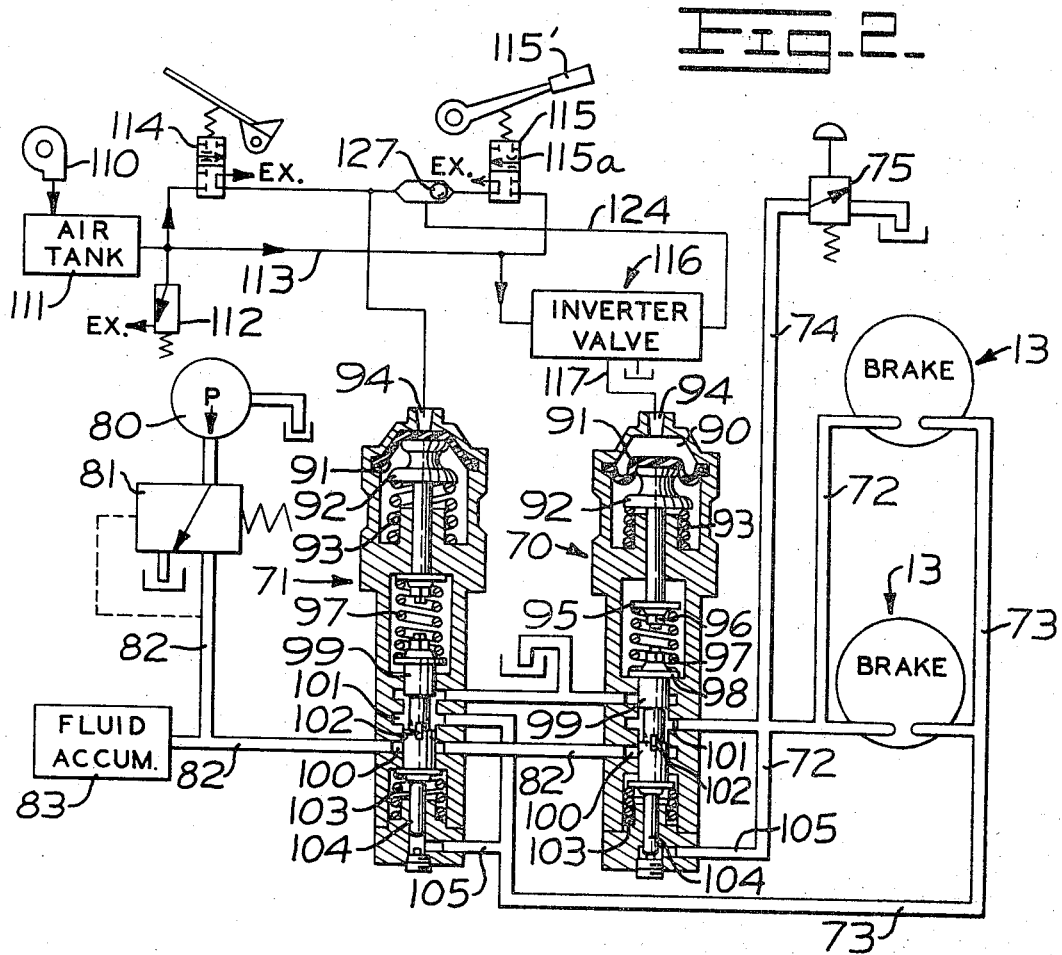
FIG. 2 is a schematic diagram of the control system for the dual-range braking system with the control valves shown in section.
Figure 3:
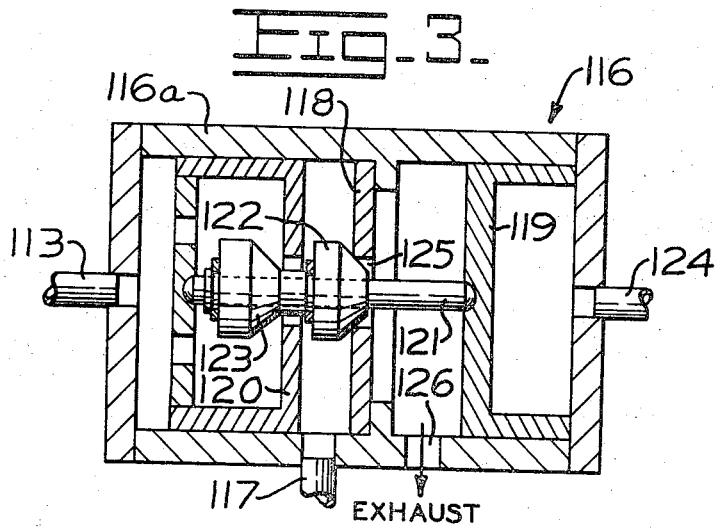
FIG. 3 is a section of the inverter valve illustrated in block form in the schematic shown in FIG. 2.

To operate the service brakes constructed according to this invention, a control system, such as illustrated in FIG. 2, is employed. In FIG. 2, two service brake assemblies 13 are illustrated connected to control valves 70 and 71, with valve 70 connected to manifold 63 of each brake assembly through hydraulic line 72 and valve 71 connected to manifold 61 of each brake assembly through hydraulic line 73. Also, connected to line 72 is a pressure relief line 74 which is controlled by emergency valve 75. Since pressure in line 72 operates to oppose the spring forces, opening the normally closed emergency valve will vent fluid from the plunger side of the piston 54 allowing braking to be accomplished immediately should the operator actuate the emergency valve. If this valve is depressed on parking the machine, the brakes are "set" until it is "reset" and hydraulic pressure is available to overcome the spring forces.

A pump 80 through a pressure relief regulator valve 81 supplies pressure to both control valves 70 and 71 through line 82 which is also connected to a fluid accumulator 83 that supplies a limited amount of pressurized hydraulic fluid if pump failure occurs and serves to dampen pressure surges. Through the above arrangement pressurized hydraulic fluid is supplied by the control valves for the dual range operation of the brake assemblies 13.

Since control valves 70 and 71 are identical, only one will be described in detail. Each control valve includes a rotochamber 90 which has a diaphragm 91 mounted therein to control a reciprocating plunger 92 which is urged toward the diaphragm by spring 93. Air pressure from a pneumatic system entering the rotochamber through port 94 acts on the diaphragm to depress the plunger and compresses spring 93 proportionally to the air pressure in the rotochamber until such time as the plunger bottoms out on a stop within the rotochamber.

On the end of the plunger opposite the diaphragm, a washer 95 retained by nut 96 engages one end of a tension spring 97 which has its opposite end abutted on a washer 98 of spool 99. This arrangement will allow air pressure vented into the rotochamber to adjust the spring tension on the spool and ultimately the hydraulic pressure controlled thereby.

Each spool forms a portion of the hydraulic-metering valve being reciprocally mounted in its control valve to meter hydraulic flow from an inlet 100 (connected to line 82) to an outlet port 101 (line 72 and 73). Smooth hydraulic pressure increase or decrease is provided by the spool through the use of bleed slots 102 in each of the spools and a spring 103 mounted in the valve body to act on the spool to close off the inlet port. On this end of the spool is a small piston 104 which abuts on one end of the associated spool and has its opposite end located in a pressure chamber which is connected to the outlet port 101 of its valve via an associated passage 105 to modulate the outlet pressure.

With the above arrangement pressure in the outlet port will assist spring 103 until their combined forces equal the force applied by the tension spring 97 as a result of the tension supplied by the position of plunger 92. Since the position of plunger 92 is a function of the air pressure in the rotochamber, the hydraulic pressures metered by the spool is proportional to the air pressure in the rotochamber. Thus, the instant control valves can gradually increase from zero outlet pressure to a maximum outlet pressure equal to that of the pump pressure, i.e., 500 p.s.i., as a function of rotochamber air pressure.

Pressures in the rotochamber are controlled by a pneumatic system which in turn is operator-controlled at the vehicles operator's platform. This pneumatic system is supplied by an air compressor 110 and air tank 111 which are controlled in pressure by pressure relief valve 112.

A pneumatic manifold 113 supplies air pressure to a foot brake 114, a hand-retarding valve 115 and an inverter valve 116. The outlet 117 of the inverter valve is connected directly to control valve 70 so that air pressure will be supplied to this rotochamber 90 during nonbraking conditions since it is necessary that hydraulic pressure be provided through line 72 to overcome the forces of springs 52 and 53 acting on their respective plungers 51 and on plate 50 to release the brakes. Thus, the function of the inverter valve is to supply maximum pneumatic pressure to the rotochamber 90 of valve 70 when no braking is required and to gradually decrease the pressure in the rotochamber as brakes 13 are applied through the first range so that the forces of springs 52 and 53 will be proportionally applied to pressure plate 50 to brake the vehicle.

The inverter valve, more fully described in U.S. Pat. application 769,481, filed Oct. 22, 1968 and entitled, Flow Control Valve, includes a cylindrical housing 116a with a dividing baffle plate 118 centrally located in the housing. Piston members 119 and 120 are reciprocally mounted in the housing on opposite sides of the baffle plate and cooperate with a stem 121 carrying two valve cones 122 and 123. Normally when piston 119 is not displaced axially inward by pressure from line 124 valve cone 122 will seat about a central aperture 125 in the baffle plate. As this cone unseats it will vent pressure in the rotochamber of valve 70 to the exhaust port 126.

When the pneumatic pressure is applied through control line 124 to piston 119, it will through stem 121 displace piston 120 toward the manifold inlet 113 so that cones 122 and 123 will gradually reduce the pressure in line 117 going to the rotochamber 90 of control valve 70. Thus, as the pressure in control line 124, displacing piston 119, proportionately increases, the pressure from the pneumatic manifold 113 will be slowly cut off from the rotochamber with the cones acting to modulate the pressure from the manifold. The rotochamber pressure will exhaust through port 126 of the inverter valve.

Relieving the pressure in rotochamber 90 of control valve 70 will cause the hydraulic pressures in line 72 to reduce proportionally to pneumatic pressures in the rotochamber so that the hydraulic pressure in manifold 63 acting against spring 52 and 53 will be gradually relieved allowing the springs to apply the service brakes 13 in the first range.

Normally, when the hand retarding lever 115' is employed, its valve 115 will cause pressurization of control line 124, so that the pressure in the rotochamber by the action of the inverter valve, will be gradually reduced as air pressure is gradually increased on piston 119. An orifice 115a is employed to achieve the desired response. However, in the arrangement shown in FIG. 2, a check valve 127 is incorporated in the control line 124 so that when the hand retarding lever is operated, only this line will be pressurized and the maximum braking through this lever actuation will be only that available through the forces of springs 51 and 52 or the first range of the dual-range braking system.

However, operation of the foot brakes through its control valve 114 will cause pressure from the pneumatic manifold to increase both in the inverter valve and in rotochamber 90 of control valve 71. Thus, control valve 70 will move to decrease the hydraulic pressures in manifold 63 so that the springs will apply the brakes and the increasing pressure building in the rotochamber of valve 71 will cause hydraulic pressure to be applied to manifold 61 in order that hydraulic pressures may act in the spring chambers upon the piston to increase the force on the pressure plate 50. Thus, control valve 71 through its actuation provides the second range of the dual-range braking system whereby hydraulic pressures assist the spring forces in applying the brakes for the second range.

It is through the above arrangement that a simple, economical dual-range braking system is provided with many outstanding safety features. It can be appreciated that through utilization of this system that if the springs provide between 30 and 60 percent of the braking capacity that such capacity will always be available for parking or an emergency situation, even though full hydraulic pressure is lost. In addition, the arrangement is such that the pressures in the system will decrease gradually and even in an emergency situation, the brakes will not be applied abruptly whereby injury might occur. However, there may be cases where the brakes should be applied abruptly and through the use of emergency valve 75, it is possible to vent the pressures in manifold 63 immediately and thereby obtain abrupt, sudden braking of the vehicle.

Through the utilization of the instant invention, a very effective and novel-braking system is supplied for use in earthmoving vehicles which overcomes many of the problems of prior art systems.

We claim:

1. A dual range fail-safe brake system for use in a drive train of a vehicle comprising:
   a plurality of interleaved braking discs assembled so that alternate discs are respectively connected to a coaxial rotating member in said drive train and to said vehicle;
   a plurality of double-acting hydraulic actuators circumferentially mounted on said vehicle adjacent to said assembled plurality of braking discs each of said actuators having an internal piston and a plunger which operably engages said assembled plurality of the discs on one side;
   a stationary plate member connected to said vehicle operably engaging said assembled plurality of braking discs on their opposite side;
   springs mounted in one end of each of said double-acting hydraulic actuators, urging said piston in a direction to cause its associated plunger to urge said assembled plurality of braking discs against said stationary plate thereby restricting the rotation of said rotating member;
   a first common hydraulic line connected with the side of each double-acting actuator having said springs;
   a second common hydraulic line connected with the opposite side of each double-acting hydraulic actuator;
   a source of pressurized hydraulic fluid; and
   a control system connected to said source of pressurized hydraulic fluid and to said first and second common hydraulic lines operable in one range to proportionally vary the force of said spring against said assembled plurality of discs by hydraulically opposing said springs and in another range to hydraulically proportionally assist the force of said springs against said assembled plurality of braking discs thereby providing dual range braking in a system wherein said spring will provide fail-safe braking upon a loss of hydraulic fluid pressure.

2. The dual range brake system as defined in claim 1 wherein the plurality of braking discs are cooled by cooling oil.